(12) United States Patent
Kaplan et al.

(10) Patent No.: US 8,438,849 B2
(45) Date of Patent: May 14, 2013

(54) MULTI-LEVEL ORGANIC RANKINE CYCLE POWER SYSTEM

(75) Inventors: Uri Kaplan, Doar Na Emek Soreq (IL); Joseph Sinai, Or-Yehuda (IL); Lucien Y. Bronicki, Yavne (IL)

(73) Assignee: Ormat Technologies, Inc., Reno, NV (US)

( * ) Notice: Subject to any disclaimer, the term of this patent is extended or adjusted under 35 U.S.C. 154(b) by 850 days.

(21) Appl. No.: 12/457,477

(22) Filed: Jun. 11, 2009

(65) Prior Publication Data

US 2010/0071368 A1 Mar. 25, 2010

Related U.S. Application Data

(63) Continuation-in-part of application No. 11/736,331, filed on Apr. 17, 2007, now Pat. No. 8,061,139.

(51) Int. Cl.
*F01K 7/34* (2006.01)
*F01K 23/04* (2006.01)

(52) U.S. Cl.
USPC .............. 60/653; 60/651; 60/655; 60/671; 60/679; 60/676

(58) Field of Classification Search .......... 60/653, 60/676, 677–679, 655, 651, 671
See application file for complete search history.

(56) References Cited

U.S. PATENT DOCUMENTS

| | | | | |
|---|---|---|---|---|
| 2,384,587 A | * | 9/1945 | Badenhausen | 60/657 |
| 4,069,674 A | * | 1/1978 | Warren | 60/641.8 |
| 4,328,675 A | * | 5/1982 | Pocrnja et al. | 60/676 |
| 6,009,711 A | * | 1/2000 | Kreiger et al. | 60/641.2 |
| 6,173,563 B1 | | 1/2001 | Vakil et al. | |
| 6,571,548 B1 | * | 6/2003 | Bronicki et al. | 60/772 |
| 6,857,268 B2 | | 2/2005 | Stinger et al. | |
| 7,469,542 B2 | | 12/2008 | Kalina | |
| 2006/0260314 A1 | | 11/2006 | Kincaid et al. | |
| 2009/0019853 A1 | | 1/2009 | Nilsoon | |

OTHER PUBLICATIONS

International Search Authority, International Search Report, Publication No. WO 2010/143046 (Published Dec. 16, 2010); Search completed Dec. 26, 2010.

* cited by examiner

*Primary Examiner* — Hoang Nguyen
(74) *Attorney, Agent, or Firm* — Nath, Goldberg & Meyer; Jerald L. Meyer

(57) ABSTRACT

A waste heat recovery system includes a high pressure turbine and a low pressure turbine, in which the high pressure turbine receives high pressure working fluid vapor, the low pressure turbine receives low pressure working fluid vapor and the high pressure turbine also supplies low pressure working fluid vapor to the low pressure turbine. A recuperator receives working fluid vapor from the low pressure turbine. The recuperator produces heated condensate, at least a portion of which is provided to a high pressure vaporizer. The high pressure vaporizer is configured to receive from a high temperature heat source and produces high pressure working vapor used to power the high pressure turbine. The remaining condensed fluid is provided to a low pressure vaporizer which is configured to receive heat from a low-temperature heat source, thereby producing low pressure working fluid vapor used to power the low pressure turbine.

31 Claims, 5 Drawing Sheets

MULTI-LEVEL ORGANIC RANKINE CYCLE POWER SYSTEM

RELATED APPLICATIONS

This application is a Continuation-in-Part Application of U.S. patent application Ser. No. 11/736,331 filed on Apr. 17, 2007, the contents of which are hereby incorporated in their entirety.

BACKGROUND

1. Field

This disclosure relates generally to the field of power generation using waste heat. More particularly, the disclosure relates to a system and method for recovering waste heat from a plurality of heat sources having different temperatures for generation of electricity.

2. Background

Significant amounts of waste heat are generated by a wide variety of industrial and commercial processes and operations. Example of sources of waste heat include heat from space heating assemblies, steam boilers, engines, and cooling systems. In general, waste heat is discharged into the environment, or occasionally used as a low grade heat source for space heating and the like.

In a typical system based on the waste heat of an internal combustion engine or other fuel-based heat source, the original source of heat (the engine) discharges heat in the form of exhaust and discharges an additional amount of heat in the form of mechanical cooling (engine cooling).

One method to generate electricity from the waste heat of a combustion engine is to apply a bottoming Rankine cycle. A Rankine cycle engine typically includes a water-based system including a turbo generator, an evaporator/boiler and a condenser; however, water based steam Rankine cycles are unattractive for low temperature waste heat systems due to high cost and low efficiency. The performance of an organic Rankine cycle (ORC) is limited by constraints of the working fluid circulated within the ORC. Any pure chemical used as a working fluid may be optimal for a specific limited range of cycle temperatures and pressures. It is therefore difficult to maximize the power output of a single fluid ORC for a system with waste heat sources of different temperature levels. The working fluid is a thermodynamic medium which functions as a working fluid in the system.

Externally Fired Gas Turbine (EGFT)/combined cycle systems have been described in the literature for a number of years. Such systems include a compressor for compressing ambient air, an indirect contact heat exchanger in which combustible products, e.g., gas and/or fuel vapors, hereinafter referred to as "combustible gases", are burned to heat the compressed air, and a turbine in which the heated compressed air is expanded driving a generator that produces electricity. Heat contained in the turbine exhaust is used to vaporize water that is converted into steam in a separate water-based, closed Rankine cycle power plant, the steam being expanded in a steam turbine in the power plant for driving a generator that produces additional electricity.

Organic Rankine Cycle power plants have been proposed for operation together with such systems, see for example U.S. Pat. Nos. 5,687,570, 5,799,490, 6,167,706 and 6,497,090, the disclosures of which are hereby incorporated by reference. In these patents, while an Organic Rankine Cycle power plant is described which produces power as a bottoming cycle to a steam turbine power cycle operated by a gas turbine power unit, an Organic Rankine cycle is also described which produces power from an intercooler of a compressor of a gas turbine power unit, see for example FIGS. 5A, 6, 7, 8, 9 and 9A of the above patents. Furthermore, in these patents, while Externally Fired Gas Turbine (EFGT) combined cycle systems are described, combined cycle power plant systems are described with include gas turbines that can be directly fired as well, see for example FIGS. 8, 9, 9A.

EFGT systems have been proposed for use with low calorific, unclean gaseous fuels as well as with hot gaseous fuels. Solid fuels are more difficult to incorporate into EFGT systems because of the problems associated with ash and noxious gases produced during the combustion process.

SUMMARY

The present disclosure is directed to a waste heat recovery system utilizing a working fluid comprising: a high pressure vapor turbine receiving high pressure working fluid vapor and producing power and low pressure working fluid vapor; a low pressure vapor turbine receiving said low pressure working fluid vapor and producing power and expanded working fluid vapor; a recuperator receiving said expanded working fluid vapor and producing heat-depleted expanded working fluid vapor; a condenser receiving said heat-depleted expanded working fluid vapor and producing condensate, said condensate recycled to said recuperator to produce heated condensate and said heat-depleted expanded working fluid vapor; a first vaporizer receiving a first portion of said heated condensate and configured to receive heat from a low-temperature heat source, thereby producing low pressure working fluid vapor; and a second vaporizer receiving a second portion of said heated condensate and configured to receive heat from a high-temperature heat source, thereby producing said high pressure working fluid vapor.

Another aspect of the present disclosure is directed to a waste heat recovery system utilizing a working fluid comprising: a high pressure vapor turbine receiving high pressure working fluid vapor and producing power and low pressure working fluid vapor; a low pressure vapor turbine receiving said low pressure working fluid vapor and producing power and expanded working fluid vapor; a recuperator receiving said expanded working fluid vapor and producing heat-depleted expanded working fluid vapor; a condenser receiving said heat-depleted expanded working fluid vapor and producing condensate, a first portion of said condensate recycled to said recuperator to produce heated condensate and said heat-depleted expanded working fluid vapor; a first vaporizer receiving a second portion of said condensate and configured to receive heat from a low-temperature heat source, thereby producing low pressure working fluid vapor; and a second vaporizer receiving said heated condensate and configured to receive heat from a high-temperature heat source, thereby producing said high pressure working fluid vapor.

A further aspect of the present subject matter is drawn to a waste heat recovery system utilizing a working fluid comprising: a high pressure vapor turbine receiving high pressure working fluid vapor and producing power and expanded high pressure working fluid vapor; a low pressure vapor turbine receiving low pressure working fluid vapor and producing power and expanded low pressure working fluid vapor; a condenser receiving said expanded high pressure working fluid vapor and said expanded low pressure working fluid vapor and producing condensate; a first vaporizer receiving a first portion of said condensate and configured to receive heat from a low-temperature heat source, thereby producing said low pressure working fluid vapor; and a second vaporizer receiving a second portion of said condensate and configured to receive heat from a high-temperature heat source, thereby producing said high pressure working fluid vapor.

A still further aspect of the present disclosure is directed to a waste heat recovery system utilizing a working fluid comprising: a high pressure vapor turbine receiving high pressure working fluid vapor and producing power and expanded high pressure working fluid vapor; a recuperator receiving said expanded high pressure working fluid vapor and producing heat-depleted expanded high pressure working fluid vapor; a first condenser receiving said heat-depleted expanded high pressure working fluid vapor and producing first condensate, said first condensate recycled to said recuperator to produce heated condensate and said heat-depleted expanded high pressure working fluid vapor; a first vaporizer receiving said heated condensate and configured to receive heat from a high-temperature heat source, thereby producing said high pressure working fluid vapor; a low pressure vapor turbine receiving low pressure working fluid vapor and producing power and expanded low pressure working fluid vapor; a second condenser receiving said expanded low pressure working fluid vapor and producing second condensate; a second vaporizer receiving said second condensate and configured to receive heat from a low-temperature heat source, thereby producing said low pressure working fluid vapor; and a generator connected to said high pressure vapor turbine and said low pressure vapor turbine for producing power.

BRIEF DESCRIPTION OF THE DRAWING

It is noted that like reference numerals in the various figures refer to similar components found within the figures.

DETAILED DESCRIPTION

Overview

The present technique provides an ability to extract waste heat from two sources. Typically, these would be two related sources, such as the coolant in a cooling jacket used for engine cooling, heat discharged from an intercooler, or direct engine exhaust; however, it is also possible to use the technique with two unrelated heat sources.

An organic Rankine Cycle power system having two vaporizers and two pressure level turbine system is used as a prime mover for driving an electric generator. Two sources of waste heat are used with each one of the two sources providing the heat for a respective one of the two vaporizers.

By using the second heat source, e.g. cooling jacket water of an internal combustion engine, and/or heated fluid from an intercooler of turbo-charged or a turbo-charger of an internal combustion engine or diesel engine, or gas engine, etc. as a heat source for the second vaporizer, better heat source to heat user match is achieved.

Recuperator Output Directed to High and Low Pressure Circuits

Figure 1:
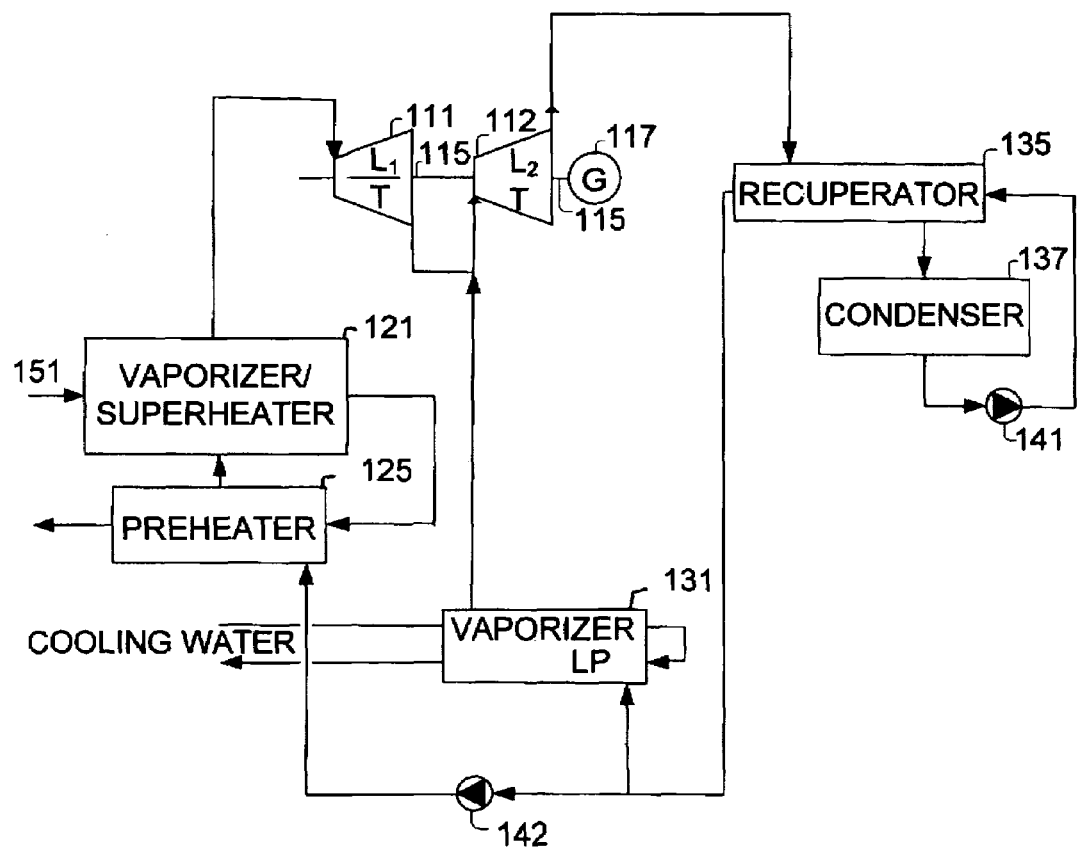
FIG. 1 is a schematic diagram showing the operation of a system with two turbines and two vaporizers.

FIG. 1 is a schematic diagram showing the operation of a system with two turbines and two vaporizers. In the configuration of FIG. 1, one vaporizer utilizes high-temperature heat from the exhaust gases of an internal combustion engine, e.g. a diesel engine, gas engine, etc., directly or by using heat transfer fluid. A second, low-pressure vaporizer utilizes lower heat present, for example, in the cooling water of the internal combustion engine and/or heated fluid from a turbo-charger of an internal combustion engine.

Depicted are high pressure and low pressure vapor turbines 111, 112, connected via common drivetrain 115 to a single generator 117. It is also contemplated that common drivetrain 115 connects the high pressure and low pressure vapor turbines 111, 112 to multiple generators. Also depicted are high pressure vaporizer 121, preheater 125, low pressure vaporizer 131, recuperator 135, condenser 137 and pump 141.

High pressure vaporizer 121 receives heat from a heat transfer fluid such as, for example, a thermal oil, indicated at 151, and transfers the heat to a working fluid, thereby producing a high pressure working fluid vapor. Alternatively, high pressure vaporizer 121 can receive heat directly from a heat source, such as heat from exhaust gas of an internal combustion engine. High pressure working fluid vapor from high pressure vaporizer 121 is used to drive high pressure vapor turbine 111. The exhaust or discharge from high pressure vapor turbine 111 is a low pressure working fluid vapor and may be combined with other low pressure working fluid vapor, as will be described, and used to drive low pressure vapor turbine 112.

The working fluid vapor is used to drive high pressure vapor and low pressure vapor turbines 111, 112. Examples of suitable working fluids include, without limitation, water, an alcohol, ethane, propane, butane, iso-butane, n-pentane, iso-pentane, hexane, iso-hexane, and mixtures thereof, as well as a synthetic alkylated aromatic heat transfer fluid, for example, the alkyl substituted aromatic fluid Therminol LT (the commercial name of the Solutia Company of Belgium), a mixture of isomers of an alkylated aromatic fluid (Dowtherm J, registered trademark of The Dow Chemical Company, USA) as described in U.S. Pat. No. 6,960,839, the disclosure of which is incorporated by reference. In addition, also one highly branched, heavy iso-paraffin hydrocarbon, or a mixture of two or more of such hydrocarbons present as the major component (i.e., at least 50% by volume) in the working fluid are included as a non-limiting example of the working fluid. An exemplary class of such an iso-paraffin includes 8 to 20, alternatively 9 to 20, carbon atom-containing hydrocarbons having at least one methyl radical ($CH_3$) arranged to achieve a highly stable compound. Furthermore, the branched iso-paraffins are highly branched, meaning that they have 3-20 methyl groups attached to tertiary or quaternary carbon atoms as described in U.S. Pat. No. 7,225,621, the disclosure of which is incorporated by reference. In a further aspect, the last mentioned example of working fluid comprises an iso-paraffin selected from the group consisting of iso-dodecane or 2,2,4,6,6-pentamethylheptane, iso-eicosane or 2,2,4,4,6,6,8,10,10-nonamethylundecane, iso-hexadecane or 2,2,4,4,6,8,8-heptamethylnonane, iso-nonane or 2,2,4,4 tetramethylpentane, or alternatively iso-octane or 2,2,4 trimethylpentane and a mixture of two or more of these compounds.

The heat transfer fluid or exhaust gas discharged from high pressure vaporizer 121 is optionally passed through preheater 125. Examples of suitable heat transfer fluids include, without limitation, thermal oil, synthetic heat transfer fluid, or mixtures thereof. When preheater 125 is engaged, high pressure vaporizer 121 can function as a superheater for the high pressure vaporized working fluid that is provided to high pressure vapor turbine 111.

Preheater 125 receives heat depleted heat transfer fluid or exhaust discharged from high pressure vaporizer 121 and produces further heat-depleted heat transfer fluid and preheated working fluid. The working fluid is passed to preheater 125 for producing preheated working fluid prior to passing through high pressure vaporizer 121, and consequently the extraction of heat from the heat transfer oil or exhaust is increased and high pressure working fluid vapor is produced.

Low pressure vaporizer 131 receives heat from a further working fluid such as, for example, engine jacket coolant and/or heated fluid from an intercooler of a turbocharger of the engine, which is generally at a lower temperature than the exhaust gas. While it is possible that the total heat output from this heat source may be close to or exceed that of the internal combustion engine exhaust, the heat source for low pressure vaporizer is considered to be a lower grade heat source due to the lower temperature.

Turbine 112 is a low pressure vapor turbine. The system uses a common working fluid for high pressure vapor and low pressure vapor turbines 111 and 112, which permits mixing of fluids used to drive the turbines 111 and 112. Low pressure vapor turbine 112 receives its low pressure working fluid vapor from the discharge of high pressure vapor turbine 112 and the output from low pressure vaporizer 131. This permits low pressure vapor turbine 112 to be optimized to efficiently extract power from the outflow from high pressure vaporizer 121, while taking into consideration that the energy from its discharge can be extracted by low pressure vapor turbine 112, making it in effect a two stage turbine but with the additional boost obtained from the outflow of low pressure vaporizer 131.

Low pressure vapor turbine 112 provides expanded working fluid to recuperator 135. A recuperator is a special purpose counter-flow heat exchanger used to recover waste heat from exhaust vapors. The outflow of low pressure vapor turbine 112 is directed to recuperator 135 where the working fluid passes a heat extraction circuit, thereby forming heat-depleted expanded working fluid vapor. The heat-depleted expanded working fluid vapor is fed to condenser 137 to produce condensate. In the hot pass side, heat is extracted from the expanded working fluid vapor and transferred to a cold pass side (internal to recuperator 135; not separately depicted). The condensate from condenser 137 is fed to pump 141, and is then supplied to recuperator 135, where the working fluid condensate passes the cold pass side and receives the heat which had been extracted from the expanded working fluid vapor in the hot pass side thereby producing heated condensate. Recuperator 135 is used to extract heat from the outflow of low pressure vapor turbine 112, prior to condensing in condenser 137 and then discharges the heat back into the fluid supplied by pump 141.

A first portion of the heated condensate is fed to low pressure vaporizer 131 and a second portion is fed to high pressure vaporizer 121 possibly using a booster pump. This results in the return of the working fluid back to high pressure vaporizer 121 and high pressure turbine 111.

While FIG. 1 depicts the low pressure working fluid vapor from high pressure vapor turbine 111 being combined with low pressure working fluid vapor from low pressure vaporizer 131 prior to being fed to low pressure vapor turbine 112, it is also contemplated that the low pressure working fluid vapor from each source is combined at the inlet of low pressure vapor turbine 112.

Recuperator Output Directed to High Pressure Circuit

Figure 2:
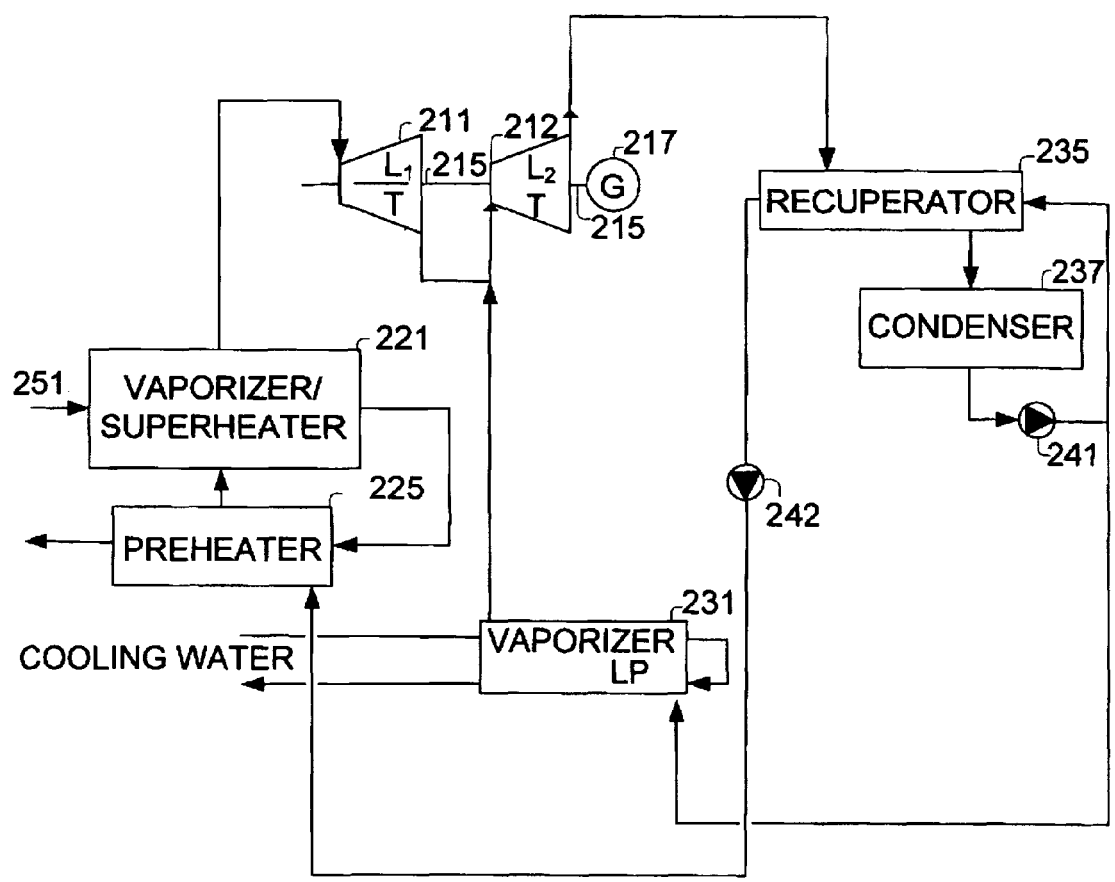
FIG. 2 is a schematic diagram showing the operation of a system in which condensate is directly charged to a low pressure vaporizer.

FIG. 2 is a schematic diagram showing the operation of a system in which condensate is directly charged to a low pressure vaporizer. As is the case with the configuration of FIG. 1, the system includes a high pressure side and a low pressure side. Most of the components are similar to those of the configuration of FIG. 1.

Depicted are high pressure and low pressure turbines 211, 212, connected via common drivetrain 215 to a single generator 217. It is also contemplated that common drivetrain 215 connects the high pressure and low pressure vapor turbines 211, 212 to multiple generators. Also depicted are high pressure vaporizer 221, preheater 225, low pressure vaporizer 231, recuperator 235, condenser 237 and pump 241. As is the case with the configuration of FIG. 1, high pressure vaporizer 221 receives heat from a heat transfer fluid such as, for example, a thermal oil, indicated at 251, which transfers the heat to a working fluid vapor, or directly from a heat source, such as heat from exhaust gas of an internal combustion engine.

The working fluid vapor is used to drive high pressure vapor and low pressure vapor turbines 211, 212. Examples of suitable working fluids include, without limitation, water, an alcohol, ethane, propane, butane, iso-butane, n-pentane, iso-pentane, hexane, iso-hexane, and mixtures thereof, as well as a synthetic alkylated aromatic heat transfer fluid, for example, the alkyl substituted aromatic fluid Therminol LT (the commercial name of the Solutia Company of Belgium), a mixture of isomers of an alkylated aromatic fluid (Dowtherm J, registered trademark of The Dow Chemical Company, USA) as described in U.S. Pat. No. 6,960,839, the disclosure of which is incorporated by reference. In addition, also one highly branched, heavy iso-paraffin hydrocarbon, or a mixture of two or more of such hydrocarbons present as the major component (i.e., at least 50% by volume) in the working fluid are included as a non-limiting example of the working fluid. An exemplary class of such an iso-paraffin includes 8 to 20, alternatively 9 to 20, carbon atom-containing hydrocarbons having at least one methyl radical ($CH_3$) arranged to achieve a highly stable compound. Furthermore; the branched iso-paraffins are highly branched, meaning that they have 3-20 methyl groups attached to tertiary or quaternary carbon atoms as described in U.S. Pat. No. 7,225,621, the disclosure of which is incorporated by reference. In a further aspect, the last mentioned example of working fluid comprises an iso-paraffin selected from the group consisting of iso-dodecane or 2,2,4,6,6-pentamethylheptane, iso-eicosane or 2,2,4,4,6,6,8, 10,10-nonamethylundecane, iso-hexadecane or 2,2,4,4,6,8, 8-heptamethylnonane, iso-nonane or 2,2,4,4 tetramethylpentane, or alternatively iso-octane or 2,2,4 trimethylpentane and a mixture of two or more of these compounds.

The working fluid vapor is at high pressure and is fed from high pressure vaporizer 221 and used to drive high pressure turbine 211. The heat transfer fluid or exhaust gas discharged from high pressure vaporizer 221 is optionally passed through preheater 225. When preheater 225 is employed, high pressure vaporizer 221 can function as a superheater to superheat the high pressure working fluid vapor that is provided to high pressure vapor turbine 211.

Preheater 225 receives heat depleted heat transfer fluid or exhaust discharged from high pressure vaporizer 221 and produces further heat-depleted heat transfer fluid and preheated working fluid. Examples of suitable heat transfer fluids include, without limitation, thermal oil, synthetic heat transfer fluid, or mixtures thereof. The working fluid is optionally passed to preheater 225 prior to passing through high pressure vaporizer 221, which increases the extraction of heat from the heat transfer fluid or exhaust and forms the high pressure working fluid vapor.

As in the case with the configuration of FIG. 1, high pressure turbine 211 produces low pressure working fluid vapor which is combined with other low pressure fluid vapor and used to drive low pressure vapor turbine 212. Low pressure vaporizer 231 receives heat from a lower temperature heat source such as from engine jacket coolant and/or an intercooler of a turbo-charger of the engine and produces low pressure working fluid vapor. The low pressure working fluid vapor is fed to low pressure vapor turbine 212.

Turbine 212 is a low pressure turbine. As is the case with the configuration of FIG. 1, the system uses a common working fluid for high pressure vapor and low pressure vapor turbines 211 and 212, which permits mixing of fluids used to drive the turbines 211 and 212. Low pressure vapor turbine 212 receives its expanded working fluid vapor from the discharge of high pressure vapor turbine 211 and the output from low pressure vaporizer 231. This permits high pressure vapor turbine 211 to be optimized to efficiently extract power from the outflow from high pressure vaporizer 221, while taking into consideration that the energy from its discharge can be extracted at low pressure vapor turbine 212, making it in effect a two stage turbine but with the additional boost obtained from the outflow of low pressure vaporizer 231.

Low pressure vapor turbine 212 receives heat from a further working fluid such as, for example, engine jacket coolant or heated fluid from an intercooler of a turbo-charger and produces expanded working fluid vapor which is fed to a hot pass side of recuperator 235, thereby producing heat-depleted expanded working fluid vapor. The heat-depleted expanded working fluid vapor from recuperator 235 is fed to condenser 237, whereby working fluid condensate is produced. The working fluid condensate from condenser 237 is fed to pump 241, and a first portion is then directed to recuperator 235, where the working fluid condensate passes the cold pass side and receives the heat which had previously been extracted from the expanded working fluid vapor in the hot pass side to produce heated condensate. Recuperator 235 is used to extract heat from the expanded working fluid vapor of low pressure vapor turbine 212, prior to condensing in condenser 237.

The heated condensate from recuperator 235 is fed to high pressure vaporizer 231 and to preheater 225 using possibly a booster pump 242. This results in the return of the high pressure working fluid vapor back to high pressure vaporizer 221 and high pressure vapor turbine 211. Low pressure vaporizer 231 receives a second portion of the condensate from condenser 237 and consequentially it is not provided with fluid from the cold pass side of recuperator 235. This balances the distribution of the working fluid condensate between the high pressure and low pressure sides and also maximizes the distribution of heat to the high pressure side of the system. This also optimizes the heat extraction capability of the system because the temperature difference between the source heat and the working fluid to be heated by the source heat is matched at the high pressure side and at the low pressure side.

As is the case with the configuration of FIG. 1, in the configuration of FIG. 2, the vaporizer utilizing the higher temperature heat source also provides a superheating function, to superheat the working fluid present in the vaporizer.

The use of two heat sources having different temperatures is thereby achieved in a more efficient manner. The heat from the two sources is input into two different vaporizers to drive a two pressure level organic Rankine cycle turbine system connected to the single electric generator 217, or optionally to multiple generators.

Condenser Output Directed to High Pressure Circuit

Figure 3:
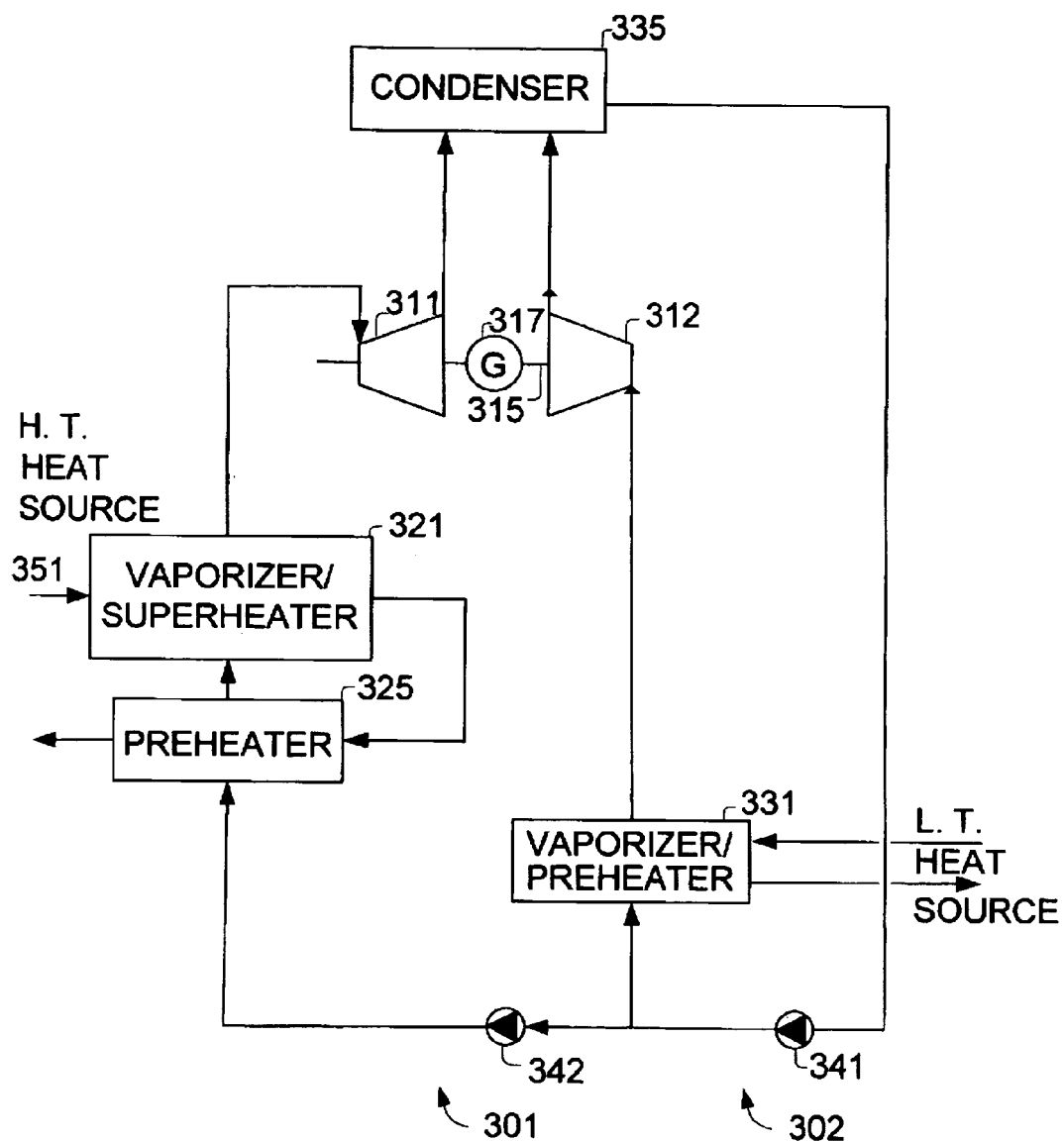
FIG. 3 is a schematic diagram showing the operation of a system in which using a common condenser receiving working fluid from two turbines.

FIG. 3 is a schematic diagram showing the operation of a system in which using a common condenser receiving working fluid from two turbines. As is the case with the configuration of FIGS. 1 and 2, the system includes a high pressure side 301 and a low pressure side 302.

Depicted are high pressure and low pressure turbines 311, 312, connected via common drivetrain 315 to a single generator 317. It is also contemplated that common drivetrain 315 connects the high pressure and low pressure vapor turbines 311, 312 to multiple generators. Also depicted are high pressure vaporizer 321, preheater 325, low pressure vaporizer 331, and a common condenser 335. Two pumps 343, 345 are depicted. As is the case with the configuration of FIGS. 1 and 2, high pressure vaporizer 321 receives heat from a heat transfer fluid such as, for example, a thermal oil, indicated at 351, which transfers the heat to a working fluid vapor, or directly from a heat source, such as heat from exhaust gas of an internal combustion engine.

The working fluid vapor is used to drive high pressure vapor and low pressure vapor turbines 311, 312. Examples of suitable working fluids include, without limitation, water, an alcohol, ethane, propane, butane, iso-butane, n-pentane, iso-pentane, hexane, iso-hexane, and mixtures thereof, as well as a synthetic alkylated aromatic heat transfer fluid, for example, the alkyl substituted aromatic fluid Therminol LT (the commercial name of the Solutia Company of Belgium), a mixture of isomers of an alkylated aromatic fluid (Dowtherm J; registered trademark of The Dow Chemical Company, USA) as described in U.S. Pat. No. 6,960,839, the disclosure of which is incorporated by reference. In addition, also one highly branched, heavy iso-paraffin hydrocarbon, or a mixture of two or more of such hydrocarbons present as the major component (i.e., at least 50% by volume) in the working fluid are included as a non-limiting example of the working fluid. An exemplary class of such an iso-paraffin includes 8 to 20, alternatively 9 to 20, carbon atom-containing hydrocarbons having at least one methyl radical ($CH_3$) arranged to achieve a highly stable compound. Furthermore, the branched iso-paraffins are highly branched, meaning that they have 3-20 methyl groups attached to tertiary or quaternary carbon atoms as described in U.S. Pat. No. 7,225,621, the disclosure of which is incorporated by reference. In a further aspect, the last mentioned example of working fluid comprises an iso-paraffin selected from the group consisting of iso-dodecane or 2,2,4,6,6-pentamethylheptane, iso-eicosane or 2,2,4,4,6,6,8, 10,10-nonamethylundecane, iso-hexadecane or 2,2,4,4,6,8, 8-heptamethylnonane, iso-nonane or 2,2,4,4 tetramethylpentane, or alternatively iso-octane or 2,2,4 trimethylpentane and a mixture of two or more of these compounds.

The working fluid vapor is at high pressure and is fed from high pressure vaporizer 321 to high pressure turbine 311. High pressure vapor turbine 311 produces power and expanded high pressure working fluid vapor, which is fed to common condenser 337.

The heat transfer fluid or exhaust gas discharged from high pressure vaporizer 321 is optionally passed through preheater 325. Examples of suitable heat transfer fluids include, without limitation, thermal oil, synthetic heat transfer fluid, or mixtures thereof. When preheater 325 is used, high pressure vaporizer 321 functions as a superheater to superheat the high pressure working fluid vapor that is provided to high pressure turbine 311.

Preheater 325 receives heat depleted heat transfer fluid or exhaust discharged from high pressure vaporizer 321 and produces further heat-depleted heat transfer fluid and preheated working fluid. The working fluid is passed to preheater 325 prior to passing through high pressure vaporizer 321, which increases the extraction of heat from the heat transfer fluid or exhaust and forms the high pressure working fluid vapor.

In this configuration, the expanded high pressure working fluid vapor from high pressure vapor turbine 311 is provided directly to the common condenser 335 without the use of a recuperator.

Turbine 312 is a low pressure turbine and receives low pressure working fluid vapor from low pressure vaporizer 331. Low pressure vapor turbine 312 produces expanded low pressure working fluid vapor that is fed directly to common condenser 335. Low pressure vaporizer 331 receives heat from a lower temperature heat source such as from engine jacket coolant and/or heated fluid from an intercooler of a turbo-charger of the engine and produces low pressure working fluid vapor that is fed to low pressure vapor turbine 312. In this example, low pressure vaporizer 331 includes a preheater, depicted as integral with vaporizer 331.

As is the case with the configuration of FIGS. 1 and 2, the system uses a common working fluid for high pressure vapor and low pressure vapor turbines 311 and 312, which permits mixing of fluids used to drive the turbines 311 and 312. In this configuration, low pressure vapor turbine 312 receives the low pressure working fluid vapor from the output of low pressure vaporizer 331, but does not receive the discharge from high pressure vapor turbine 311, which instead goes directly to the condenser 335. This permits low pressure vapor turbine 312 to be optimized to efficiently extract power from the outflow from low pressure vaporizer 331 and to receive the low pressure working fluid vapor independent of the discharge of high pressure vapor turbine 311.

Condenser 335 receives the expanded high pressure working fluid vapor and the expanded low pressure working fluid vapor and produces condensate. The condensate is directed to pump 341. A first portion of the condensate is pumped to low pressure vaporizer 331. A second portion of the condensate is pumped to a second booster pump, 342. The second portion of condensate is then fed to high pressure vaporizer 321, optionally via preheater 325. Pump 342 provides the working fluid to preheater 325 at an increased pressure above that provided to low pressure vaporizer 331. The use of two pumps 341, 342 permits a desired balance to be achieved between the high pressure side 301 and low pressure side 302.

Similar results can be achieved with one pump 341 by providing a restrictor or throttle valve in the connection between pump 342 and low pressure vaporizer 331. If the flow of fluid to low pressure vaporizer 331 is adequately restricted, then pump 342 can be eliminated.

As is the case with the configuration of FIGS. 1 and 2, in the configuration of FIG. 3, the vaporizer utilizing the higher temperature heat source can also provide a superheating function, to superheat the working fluid present in the vaporizer when the preheater is present.

The use of two heat sources having different temperatures is thereby achieved in a more efficient manner. The heat from the two sources is input into two different vaporizers to drive a two pressure level organic Rankine cycle turbine system connected to the single electric generator 317 or to multiple generators.

Separate High Pressure and Low Pressure Circuits

Figure 4:
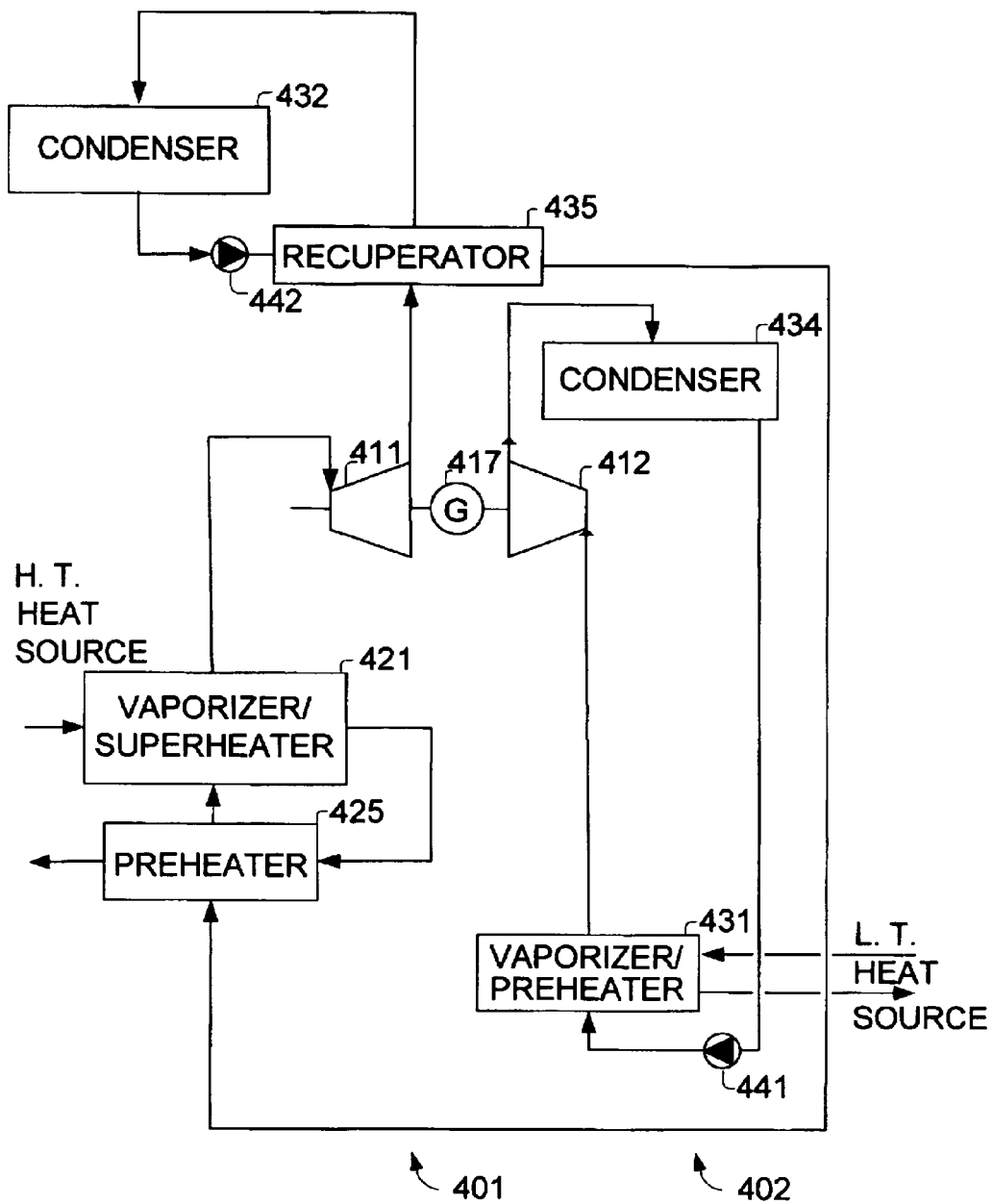
FIG. 4 is a schematic diagram showing the operation of a system in which two turbines operate with independent fluid circuits.

FIG. 4 is a schematic diagram showing the operation of a system in which fluid circuits associated with two turbines are separate. As is the case with the configuration of FIGS. 1-3, the system includes a high pressure side 401 and a low pressure side 402.

Depicted are high pressure and low pressure turbines 411, 412, connected via common drivetrain 415 to a single generator 417. It is also contemplated that common drivetrain 415 connects the high pressure and low pressure vapor turbines 411, 412 to multiple generators. Also depicted are high pressure vaporizer 421, preheater 425 and a low pressure vaporizer 431. The system uses separate condensers 432, 434, a single recuperator 435 and two pumps 447, 449. As is the case with the configuration of FIGS. 1 and 2, high pressure vaporizer 421 receives heat from a heat transfer fluid such as, for example, a thermal oil, which transfers the heat to a working fluid vapor, or directly from a heat source, such as heat from exhaust gas of an internal combustion engine.

The working fluid vapor is used to drive high pressure vapor turbine 411. Examples of suitable working fluids include, without limitation, water, an alcohol, ethane, propane, butane, iso-butane, n-pentane, iso-pentane, hexane, iso-hexane, and mixtures thereof, as well as a synthetic alkylated aromatic heat transfer fluid, for example, the alkyl substituted aromatic fluid Therminol LT (the commercial name of the Solutia Company of Belgium), a mixture of isomers of an alkylated aromatic fluid (Dowtherm J, registered trademark of The Dow Chemical Company, USA) as described in U.S. Pat. No. 6,960,839, the disclosure of which is incorporated by reference. In addition, also one highly branched, heavy iso-paraffin hydrocarbon, or a mixture of two or more of such hydrocarbons present as the major component (i.e., at least 50% by volume) in the working fluid are included as a non-limiting example of the working fluid. An exemplary class of such an iso-paraffin includes 8 to 20, alternatively 9 to 20, carbon atom-containing hydrocarbons having at least one methyl radical ($CH_3$) arranged to achieve a highly stable compound. Furthermore, the branched iso-paraffins are highly branched, meaning that they have 3-20 methyl groups attached to tertiary or quaternary carbon atoms as described in U.S. Pat. No. 7,225,621, the disclosure of which is incorporated by reference. In a further aspect, the last mentioned example of working fluid comprises an iso-paraffin selected from the group consisting of iso-dodecane or 2,2,4,6,6-pentamethylheptane, iso-eicosane or 2,2,4,4,6,6,8,10,10-nonamethylundecane, iso-hexadecane or 2,2,4,4,6,8,8-heptamethylnonane, iso-nonane or 2,2,4,4 tetramethylpentane, or alternatively iso-octane or 2,2,4 trimethylpentane and a mixture of two or more of these compounds.

Non-limiting examples of the working fluid of the low pressure turbine cycle are water, alcohol, ethane, propane, butane, iso-butane, n-pentane, iso-pentane, hexane, iso-hexane and mixtures thereof.

The high pressure working fluid vapor is fed from high pressure vaporizer 421 and used to drive high pressure vapor turbine 411. The heat transfer fluid or exhaust gas discharged from high pressure vaporizer 421 is optionally passed through preheater 425. When preheater 425 is used, high pressure vaporizer 421 functions as a superheater for the high pressure vaporized working fluid that is provided to high pressure vapor turbine 411.

Preheater 425 receives heat depleted heat transfer fluid or exhaust discharged from high pressure vaporizer 421 and produces further heat-depleted heat transfer fluid and preheated working fluid. Examples of suitable heat transfer fluids include, without limitation, thermal oil, synthetic heat transfer fluid, or mixtures thereof. The working fluid is passed to preheater 425 prior to passing through high pressure vaporizer 421, which increases the extraction of heat from the heat transfer oil or exhaust and forms the high pressure working fluid vapor.

In this configuration, the fluid circuits for the high pressure side 401 and the low pressure side 402 are separate, although turbines 411, 412 are optionally connected via the common drivetrain 415 as mentioned above.

Turbine 411 is a high pressure turbine, and receives the high pressure working fluid vapor from high pressure vaporizer 421. High pressure vapor turbine produces power via generator 417 and also expanded high pressure working fluid vapor.

Expanded high pressure working fluid vapor from high pressure vapor turbine 411 is directed to recuperator 435 where the working fluid passes through a heat extraction circuit (internal to recuperator 435; not separately depicted) forming heat-depleted expanded high pressure working fluid vapor. The heat-depleted expanded high pressure working fluid vapor is then fed to a first condenser 432. In the hot pass side, heat is extracted from the expanded high pressure working fluid vapor and transferred to a cold pass side (internal to recuperator 435; not separately depicted). Condenser 432 produces a first condensate, which is fed to pump 442, and is then supplied to recuperator 435. The first condensate passes the cold pass side of recuperator 435 and receives the heat which had been extracted from the expanded high pressure working fluid vapor in the hot pass side, thereby producing heated condensate. Recuperator 435 is used to extract heat from the outflow of high pressure turbine 411, prior to condensing in condenser 432 and then discharges the heat back into the fluid supplied by pump 442. The heated condensate is then fed to high pressure vaporizer 421, optionally via preheater 425.

Turbine 412 is a low pressure vapor turbine and receives low pressure working fluid vapor from low pressure vaporizer 431. Low pressure vaporizer 431 receives heat from a lower temperature heat source such as from engine jacket coolant and/or heated fluid from an intercooler of a turbo-charger of the engine. In this example, low pressure vaporizer 431 favorably includes a preheater, depicted for example as integral with vaporizer 431.

Low pressure vapor turbine 412 produces power and expanded low pressure working fluid vapor. The expanded low pressure working fluid vapor is provided to second condenser 434, which produces a second condensate. The second condensate of condenser 434 is directed to pump 441, and the output from pump 441 is directed to low pressure vaporizer 431 for supplying second condensate to this vaporizer. While a recuperator is not shown on the low pressure side 402, it is possible to use a recuperator on the low pressure side 402 as well.

As indicated above, high pressure side 401 and low pressure side 402 are connected by generator 417, which is connected by a common drive train to both high pressure vapor turbine 411 and low pressure vapor turbine 412.

The system in this example does not require the use of a common working fluid for high pressure vapor and low pressure vapor turbines 411 and 412. This permits turbines 411 and 412 to be optimized to efficiently extract power according the thermal characteristics of their respective heat sources. Despite the separate working fluid circuits for turbines 411 and 412, the use of two heat sources having different temperatures is thereby achieved in a more efficient manner. The heat from the two sources is input into two different vaporizers to drive a two pressure level organic Rankine cycle turbine system connected to the single electric generator 417 or to multiple generators.

Energy Conversion

Figure 5:
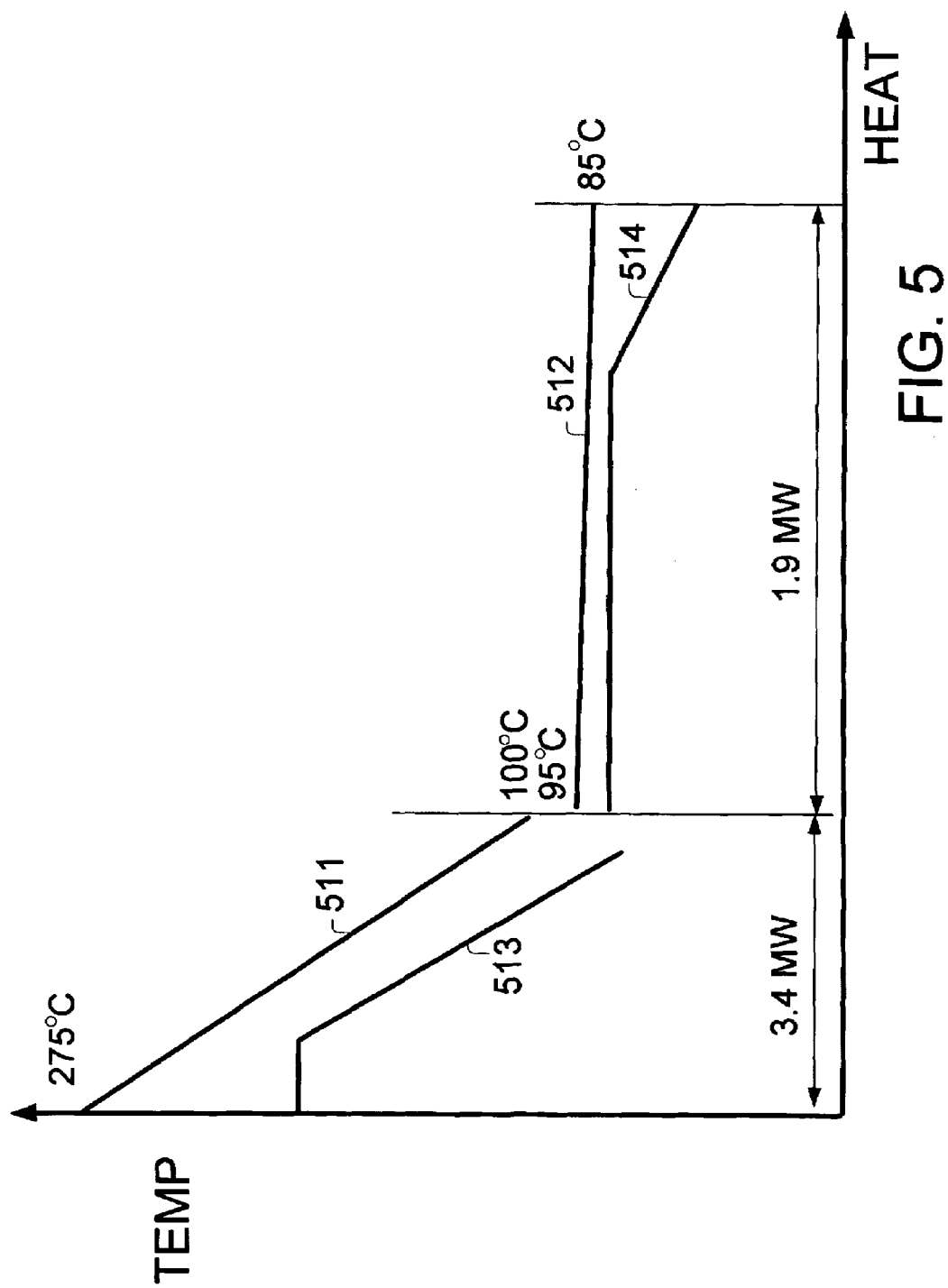
FIG. 5 is a graph depicting temperature drop across a dual turbine system.

FIG. 5 is a graph depicting an example of the temperature drop across a dual turbine system for a system such as depicted in FIGS. 1 and 2. This depiction is for explanation only and does not represent actual results or actual calculations. The temperatures are those of the heat source and are represented by steep line 511 and shallow line 512. On the left side of the graph, steep line 511 indicates a temperature drop through high pressure vaporizer 121 (FIG. 1) or 221 (FIG. 2). The temperature drop is represented as a drop from 275° C. to 100° C. Shallow line 512 on the right side of the graph depicts a lesser temperature drop through low pressure vaporizer 131 (FIG. 1) or 231 (FIG. 2). The temperature drop is represented as a drop from 95° C. to 85° C. A turbine optimized for extracting energy corresponding to steep line 511 would have vaporizer-preheater design parameters depicted by line 513 while a turbine optimized for extracting energy corresponding to shallow line 512 would have vaporizer-preheater design parameters depicted by line 514.

The temperature drops for FIGS. 3 and 4 would be similar, even though there is no serial fluid connection between turbines 311 and 312 (FIG. 3). or turbines 411 and 412 (FIG. 4).

In this depiction, the energy extracted from heat source depicted by steep line 511 is 3.4 MW, and the energy extracted heat source depicted by shallow line 512 is 1.9 MW. As can be seen, the amount of energy from the heat source to shallow line 512 (1.9 MW) is proportionally greater than the amount extracted corresponding to steep line 511, as compared to the differences in temperature drops. This would result from a larger amount of heat being extracted corresponding to shallow line 512, and generally corresponds to a larger volume of fluid flowing through low pressure turbine 112 (FIG. 1) or 212 (FIG. 2).

Scalability

The system is scalable, in that more than two vaporizers and turbines can be used. One example would be the use of an intercooler of a turbo-charger to provide a low level heat source. The low level heat source can be used to preheat the working fluid supplied to one of the other vaporizers, or can be used to drive a separate turbine. To the extent that the working fluid is able to extract heat from the intercooler, the additional heat exchange enhances the efficiency of the turbo-charger.

While the above description refers to an engine jacket coolant and/or the intercooler of a supercharger or turbo-charger of an internal combustion engine, it is contemplated that the present subject matter can also be carried out wherein the low pressure vaporizer receives heat from heated fluid from an intercooler of a compressor of a gas turbine.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A waste heat recovery system utilizing a working fluid comprising:
 a high pressure vapor turbine receiving high pressure working fluid vapor and producing power and low pressure working fluid vapor;
 a low pressure vapor turbine receiving said low pressure working fluid vapor and producing power and expanded working fluid vapor;
 a recuperator receiving said expanded working fluid vapor and producing heat-depleted expanded working fluid vapor;

a condenser receiving said heat-depleted expanded working fluid vapor and producing condensate, said condensate recycled to said recuperator to produce heated condensate and said heat-depleted expanded working fluid vapor;
a first vaporizer receiving a first portion of said heated condensate and configured to receive heat from a low-temperature heat source, thereby producing low pressure working fluid vapor; and
a second vaporizer receiving a second portion of said heated condensate and configured to receive heat from a high-temperature heat source, thereby producing said high pressure working fluid vapor.

2. The waste heat recovery system according to claim 1 wherein said first vaporizer receives heat from said low-temperature heat source through a further working fluid and said first vaporizer produces heat-depleted further working fluid along with said low pressure working fluid vapor.

3. The waste heat recovery system according to claim 2 wherein said further working fluid is cooling water.

4. The waste heat recovery system according to claim 1 wherein said second vaporizer receives heat from said high-temperature heat source through a heat transfer fluid and said second vaporizer produces heat-depleted heat transfer fluid along with said high pressure working fluid vapor.

5. The waste heat recovery system according to claim 4 wherein said heat transfer fluid is selected from the group consisting of exhaust gases, a thermal oil, and a synthetic heat transfer fluid.

6. The waste heat recovery system according to claim 4 further comprising a preheater receiving said second portion of said heated condensate and said heat-depleted heat transfer fluid and producing further heat-depleted heat transfer fluid and further heated condensate, said further heated condensate supplied to second vaporizer.

7. The waste heat recovery system according to claim 1 wherein said working fluid is selected from the group consisting of water, alcohol, butane, iso-butane, n-pentane, iso-pentane, hexane, iso-hexane, and mixtures thereof.

8. The waste heat recovery system according to claim 1 wherein said low pressure working fluid vapor from said high pressure turbine and said low pressure working fluid vapor from said first vaporizer are combined prior to being supplied to said low pressure vapor turbine.

9. The waste heat recovery system according to claim 1 wherein said low pressure working fluid vapor from said high pressure turbine and said low pressure working fluid vapor from said first vaporizer are combined in said low pressure vapor turbine.

10. A waste heat recovery system utilizing a working fluid comprising:
a high pressure vapor turbine receiving high pressure working fluid vapor and producing power and low pressure working fluid vapor;
a low pressure vapor turbine receiving said low pressure working fluid vapor and producing power and expanded working fluid vapor;
a recuperator receiving said expanded working fluid vapor and producing heat-depleted expanded working fluid vapor;
a condenser receiving said heat-depleted expanded working fluid vapor and producing condensate, a first portion of said condensate recycled to said recuperator to produce heated condensate and said heat-depleted expanded working fluid vapor;
a first vaporizer receiving a second portion of said condensate and configured to receive heat from a low-temperature heat source, thereby producing low pressure working fluid vapor; and
a second vaporizer receiving said heated condensate and configured to receive heat from a high-temperature heat source, thereby producing said high pressure working fluid vapor.

11. The waste heat recovery system according to claim 10 wherein said first vaporizer receives heat from said low-temperature heat source through a first further working fluid and said first vaporizer produces heat-depleted first further working fluid along with said low pressure working fluid vapor.

12. The waste heat recovery system according to claim 11 wherein said first further working fluid is cooling water.

13. The waste heat recovery system according to claim 10 wherein said second vaporizer receives heat from said high-temperature heat source through a heat transfer fluid and said second vaporizer produces heat-depleted heat transfer fluid along with said high pressure working fluid vapor.

14. The waste heat recovery system according to claim 13 wherein said heat transfer fluid is selected from the group consisting of exhaust gases, a thermal oil, and a synthetic heat transfer fluid.

15. The waste heat recovery system according to claim 13 further comprising a preheater receiving said heated condensate and said heat-depleted heat transfer fluid and producing further heat-depleted heat transfer fluid and further heated condensate, said further heated condensate supplied to said second vaporizer.

16. The waste heat recovery system according to claim 10 wherein said working fluid is selected from the group consisting of water, alcohol, butane, iso-butane, n-pentane, iso-pentane, hexane, iso-hexane, and mixtures thereof.

17. The waste heat recovery system according to claim 10 wherein said low pressure working fluid vapor from said high pressure turbine and said low pressure working vapor from said first vaporizer are combined prior to being supplied to said low pressure vapor turbine.

18. A waste heat recovery system utilizing a working fluid comprising:
a high pressure vapor turbine receiving high pressure working fluid vapor and producing power and expanded high pressure working fluid vapor;
a low pressure vapor turbine receiving low pressure working fluid vapor and producing power and expanded low pressure working fluid vapor;
a condenser receiving said expanded high pressure working fluid vapor and said expanded low pressure working fluid vapor and producing condensate;
a first vaporizer receiving a first portion of said condensate and configured to receive heat from a low-temperature heat source, thereby producing said low pressure working fluid vapor; and
a second vaporizer receiving a second portion of said condensate and configured to receive heat from a high-temperature heat source, thereby producing said high pressure working fluid vapor.

19. The waste heat recovery system according to claim 18 wherein said first vaporizer receives heat from said low-temperature heat source through a further working fluid and said first vaporizer produces heat-depleted further working fluid along with said low pressure working fluid vapor.

20. The waste heat recovery system according to claim 19 wherein said further working fluid is cooling water.

21. The waste heat recovery system according to claim 18 wherein said second vaporizer receives heat from said high-temperature heat source through a heat transfer fluid and said second vaporizer produces heat-depleted heat transfer fluid along with said high pressure working fluid vapor.

22. The waste heat recovery system according to claim 21 wherein said heat transfer fluid is selected from the group consisting of exhaust gases, a thermal oil, and a synthetic heat transfer fluid.

23. The waste heat recovery system according to claim 21 further comprising a preheater receiving said heated condensate and said heat-depleted heat transfer fluid and producing further heat-depleted heat transfer fluid and further heated condensate, said further heated condensate supplied to said second vaporizer.

24. The waste heat recovery system according to claim 18 wherein said working fluid is selected from the group consisting of water, alcohol, butane, iso-butane, n-pentane, iso-pentane, hexane, iso-hexane, and mixtures thereof.

25. A waste heat recovery system utilizing a working fluid comprising:
- a high pressure vapor turbine receiving high pressure working fluid vapor and producing power and expanded high pressure working fluid vapor;
- a recuperator receiving said expanded high pressure working fluid vapor and producing heat-depleted expanded high pressure working fluid vapor;
- a first condenser receiving said heat-depleted expanded high pressure working fluid vapor and producing first condensate, said first condensate recycled to said recuperator to produce heated condensate and said heat-depleted expanded high pressure working fluid vapor;
- a first vaporizer receiving said heated condensate and configured to receive heat from a high-temperature heat source, thereby producing said high pressure working fluid vapor;
- a low pressure vapor turbine receiving low pressure working fluid vapor and producing power and expanded low pressure working fluid vapor;
- a second condenser receiving said expanded low pressure working fluid vapor and producing second condensate;
- a second vaporizer receiving said second condensate and configured to receive heat from a low-temperature heat source, thereby producing said low pressure working fluid vapor; and
- a generator connected to said high pressure vapor turbine and said low pressure vapor turbine for producing power.

26. The waste heat recovery system according to claim 25 wherein said second vaporizer receives heat from said low-temperature heat source through a first further working fluid and said second vaporizer produces heat-depleted first further working fluid along with said low pressure working fluid vapor.

27. The waste heat recovery system according to claim 26 wherein said first further working fluid is cooling water.

28. The waste heat recovery system according to claim 25 wherein said first vaporizer receives heat from said high-temperature heat source through a heat transfer fluid and said first vaporizer produces heat-depleted heat transfer fluid along with said high pressure working fluid vapor.

29. The waste heat recovery system according to claim 28 wherein said heat transfer fluid is selected from the group consisting of exhaust gases, a thermal oil, and a synthetic heat transfer fluid.

30. The waste heat recovery system according to claim 28 further comprising a preheater receiving said heated condensate and said heat-depleted heat transfer fluid and producing further heat-depleted heat transfer fluid and further heated condensate, said further heated condensate supplied to said first vaporizer.

31. The waste heat recovery system according to claim 25 wherein said working fluid is selected from the group consisting of water, alcohol, butane, iso-butane, n-pentane, iso-pentane, hexane, iso-hexane, and mixtures thereof.

* * * * *